United States Patent
Subramanian et al.

(10) Patent No.: US 11,508,140 B2
(45) Date of Patent: Nov. 22, 2022

(54) AUTO-CONFIGURING A REGION OF INTEREST (ROI) ASSOCIATED WITH A CAMERA

(71) Applicant: Sensormatic Electronics, LLC, Boca Raton, FL (US)

(72) Inventors: Gopi Subramanian, Delray Beach, FL (US); Joseph Celi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 111 days.

(21) Appl. No.: 17/067,035

(22) Filed: Oct. 9, 2020

(65) Prior Publication Data

US 2022/0114377 A1    Apr. 14, 2022

(51) Int. Cl.
| | |
|---|---|
| G06V 10/20 | (2022.01) |
| G06T 7/246 | (2017.01) |
| G06V 20/52 | (2022.01) |
| G06V 40/10 | (2022.01) |
| G06V 10/62 | (2022.01) |

(52) U.S. Cl.
CPC ............ *G06V 10/255* (2022.01); *G06T 7/248* (2017.01); *G06V 20/52* (2022.01); *G06V 40/10* (2022.01); *G06T 2207/30196* (2013.01); *G06T 2207/30241* (2013.01); *G06V 10/62* (2022.01)

(58) Field of Classification Search
CPC ...... G06V 10/255; G06V 20/52; G06V 40/10; G06V 10/62; G06T 7/248; G06T 2207/30196; G06T 2207/30241
See application file for complete search history.

(56) References Cited

U.S. PATENT DOCUMENTS

| | | | | |
|---|---|---|---|---|
| 9,524,028 | B2* | 12/2016 | Dai | G06T 7/11 |
| 9,566,004 | B1* | 2/2017 | Radwin | A61B 5/0002 |
| 11,354,728 | B2* | 6/2022 | Chachek | G06V 20/20 |
| 11,373,331 | B2* | 6/2022 | Huelsdunk | G06T 7/73 |
| 2013/0335635 | A1* | 12/2013 | Ghanem | H04N 5/14 |
| | | | | 348/571 |
| 2018/0349710 | A1* | 12/2018 | Houri | G06V 20/53 |
| 2019/0087661 | A1* | 3/2019 | Lee | G06V 10/25 |
| 2019/0180597 | A1* | 6/2019 | Wang | G06V 40/16 |
| 2021/0224615 | A1* | 7/2021 | Winzell | G06V 40/103 |

* cited by examiner

*Primary Examiner* — Pinalben Patel
(74) *Attorney, Agent, or Firm* — ArentFox Schiff LLP

(57) ABSTRACT

Disclosed herein are apparatuses and methods for auto-configuring a region of interest (ROI) associated with a camera. In one implementation, a method comprises receiving image frames from a camera installed in the environment, wherein the ROI is located within the view of the image frames. The method includes tracking a plurality of persons in the image frames and determining a respective trajectory of movement for each person of the plurality of persons. The method further includes comparing each of the respective trajectories to one another and identifying, based on the comparing, a common trajectory shared by more than one person of the plurality of persons, wherein the common trajectory is not fully encompassed in the ROI. The method additionally includes updating the ROI to encompass the common trajectory, and includes configuring the updated ROI to be associated with new image frames from the camera.

20 Claims, 5 Drawing Sheets

AUTO-CONFIGURING A REGION OF INTEREST (ROI) ASSOCIATED WITH A CAMERA

TECHNICAL FIELD

The described aspects relate to object tracking systems.

BACKGROUND

Aspects of the present disclosure relate generally to object tracking systems, and more particularly, to auto-configuring a region of interest (ROI) associated with a camera used to track one or more persons. Cameras are often utilized for various use cases involving object tracking. For example, a camera may be placed above a door for security purposes (e.g., to detect if an intruder has entered the premises) or simply to count the number of people entering or exiting a location. However, in locations with a considerable amount of foot traffic, the detection and counting may be thrown off by outliers. For example, a person may walk nearby the door and be counted as someone entering—even though the person did not actually enter through the door.

Accordingly, there exists a need for improvements in object tracking systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for auto-configuring a region of interest (ROI) associated with a camera, comprising receiving a plurality of image frames from a camera installed in the environment, wherein the plurality of image frames depicts a view of the environment and wherein the ROI is located within the view. The method includes tracking a plurality of persons in the plurality of image frames. The method includes determining a plurality of respective trajectories including a respective trajectory of movement for each person of the plurality of persons. The method further includes comparing each of the plurality of respective trajectories to one another. The method further includes identifying, based on the comparing, a common trajectory shared by more than one person of the plurality of persons, wherein the common trajectory has a common start point and a common end point, and wherein at least one of the common start point and common end point are not captured in the ROI. The method additionally includes updating the ROI to define an updated ROI that is configured to encompass the common trajectory, and configuring the updated ROI to be associated with new image frames from the camera.

Another example implementation includes an apparatus for auto-configuring a region of interest (ROI) associated with a camera, comprising a memory and a processor in communication with the memory. The processor is configured to receive a plurality of image frames from a camera installed in the environment, wherein the plurality of image frames depicts a view of the environment and wherein the ROI is located within the view. The processor is configured to track a plurality of persons in the plurality of image frames. The processor is configured to determine a plurality of respective trajectories including a respective trajectory of movement for each person of the plurality of persons. The processor is configured to compare each of the plurality of respective trajectories to one another. The processor is configured to identify, based on the comparing, a common trajectory shared by more than one person of the plurality of persons, wherein the common trajectory has a common start point and a common end point, and wherein at least one of the common start point and common end point are not captured in the ROI. The processor is further configured to update the ROI to define an updated ROI that is configured to encompass the common trajectory, and configure the updated ROI to be associated with new image frames from the camera.

Another example implementation includes an apparatus for auto-configuring a region of interest (ROI) associated with a camera, comprising means for receiving a plurality of image frames from a camera installed in the environment, wherein the plurality of image frames depicts a view of the environment and wherein the ROI is located within the view. The apparatus further comprises means for tracking a plurality of persons in the plurality of image frames. The apparatus further comprises means for determining a plurality of respective trajectories including a respective trajectory of movement for each person of the plurality of persons. The apparatus further comprises means for comparing each of the plurality of respective trajectories to one another. The apparatus further comprises means for identifying, based on the comparing, a common trajectory shared by more than one person of the plurality of persons, wherein the common trajectory has a common start point and a common end point, and wherein at least one of the common start point and common end point are not captured in the ROI. The apparatus further comprises means for updating the ROI to define an updated ROI that is configured to encompass the common trajectory, and means for configuring the updated ROI to be associated with new image frames from the camera.

Another example implementation includes a computer-readable medium for auto-configuring a region of interest (ROI) associated with a camera, executable by a processor to receive a plurality of image frames from a camera installed in the environment, wherein the plurality of image frames depicts a view of the environment and wherein the ROI is located within the view. The instructions are further executable to track a plurality of persons in the plurality of image frames. The instructions are further executable to determine a plurality of respective trajectories including a respective trajectory of movement for each person of the plurality of persons. The instructions are further executable to compare each of the plurality of respective trajectories to one another. The instructions are further executable to identify, based on the comparing, a common trajectory shared by more than one person of the plurality of persons, wherein the common trajectory has a common start point and a common end point, and wherein at least one of the common start point and common end point are not captured in the ROI. The instructions are further executable to update the ROI to define an updated ROI that is configured to encompass the common trajectory, and configure the updated ROI to be associated with new image frames from the camera.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that configure the ROI in a camera to improve performance in performing various tasks. For example, if the task of a camera is to count the number of people in a queue at a store, the apparatuses and methods automatically lock-in at an area of the video frame where the queue may be, based on the trajectories of movement of people being captured by the camera. Locking-in, which involves configuring the ROI, thus allows for outliers (e.g., people near and outside of the queue) to be identified and not included in the count.

Figure 1:
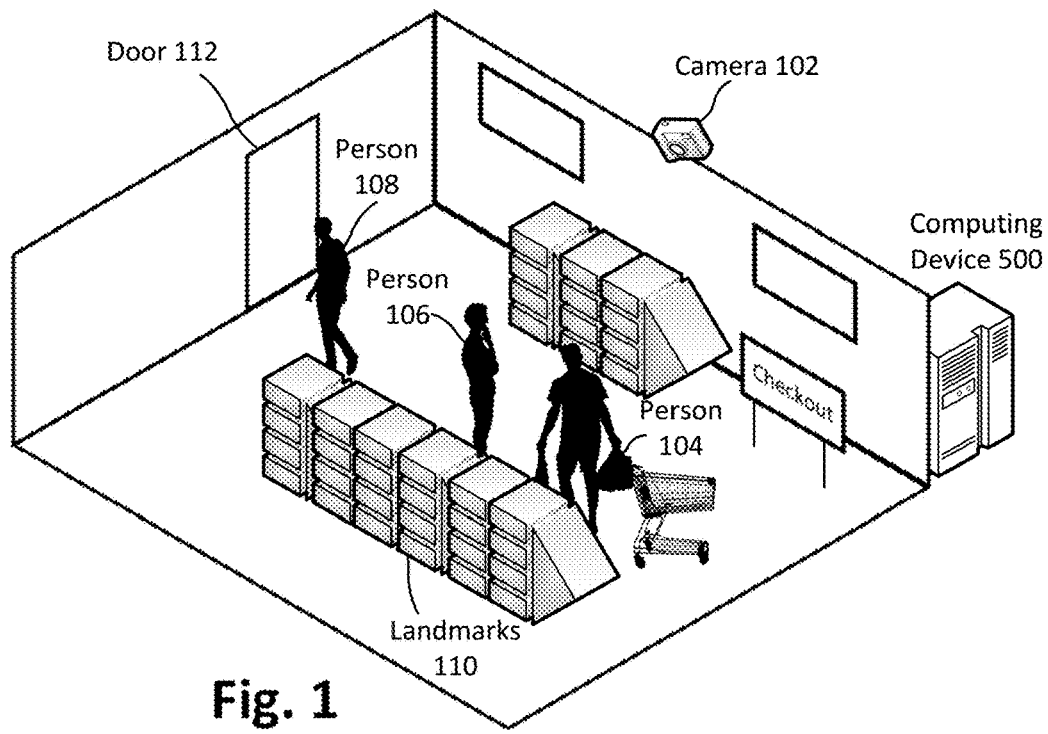
FIG. 1 is a diagram of an environment that includes a camera, in accordance with exemplary aspects of the present disclosure.

FIG. 1 is a diagram of environment 100 that includes camera 102, in accordance with exemplary aspects of the present disclosure. Suppose that environment 100 is a grocery store and camera 102 is installed near the ceiling of environment 100. The visual stream captured by camera 102, which may be a video or a series of periodic images marked by timestamps, may be transmitted to computing device 500. Computing device 500 may be a computer, a laptop, a smartphone, a server, or any device capable of receiving the visual stream from camera 102 and processing it using a ROI configuring component 515 (discussed in FIGS. 5-8). Computing device 500 may be located in environment 100 or away from/outside of environment 100, or integrated within camera 102. Furthermore, camera 102 may be connected to computing device 500 wirelessly (e.g., via Bluetooth, Wi-Fi, etc.) or through a wired connection (e.g., USB).

Figure 2:
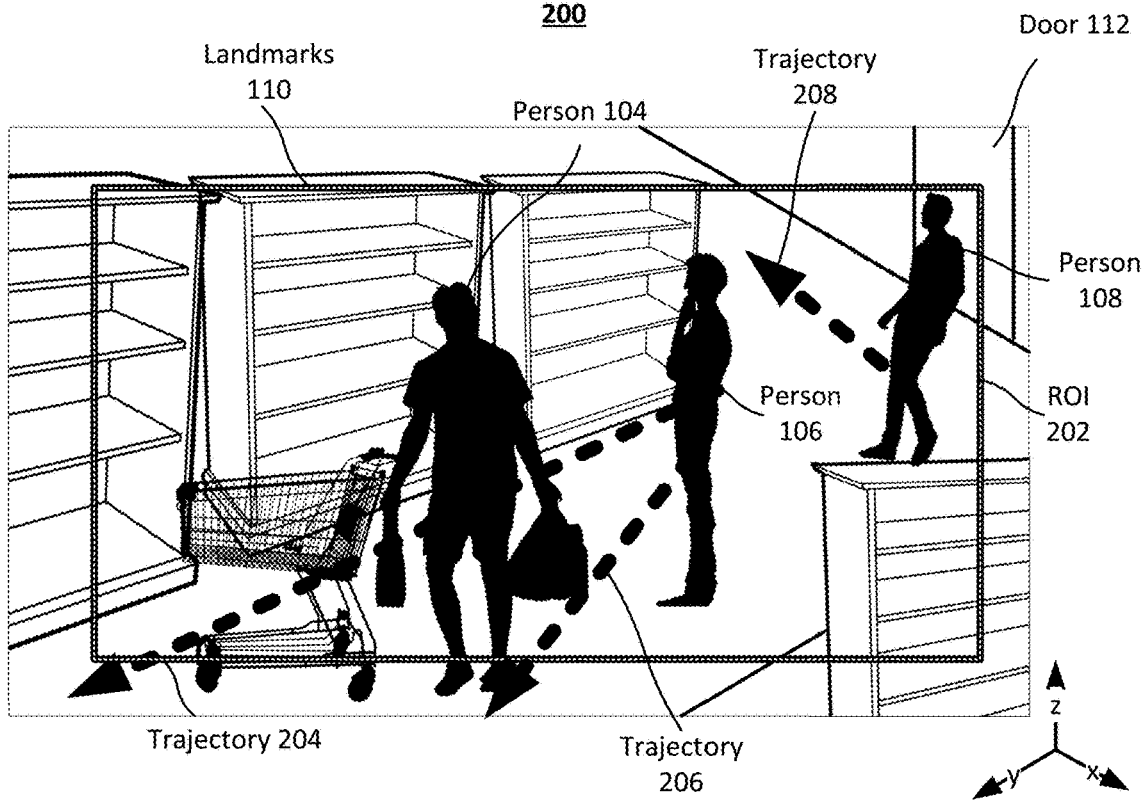
FIG. 2 is a diagram of a view of the camera in FIG. 1 with an initial ROI, in accordance with exemplary aspects of the present disclosure.

Environment 100 may include door 112 and landmarks 110 (e.g., shelves, fridges, racks, etc.). One or more persons such as persons 104, 106, and 108 may walk through environment 100. Persons 104, 106, and 108 may be employees, customers, managers, security officers, etc. When walking, for example, persons 104 and 106 may enter a checkout line. Person 108 may be walking away from the checkout line, FIG. 2 is a diagram of view 200 of camera 102 in FIG. 1 with an initial ROI 202, in accordance with exemplary aspects of the present disclosure. ROI 202 is depicted as a boundary of a rectangular shape and captures person 104, person 106, and person 108. Each person has their own respective movements. For example, person 104 is moving along trajectory 204, person 106 is moving along trajectory 206, and person 108 is moving along trajectory 208. If camera 102 is used to count the number of people entering a checkout line based on being located within ROI 202, because ROI 202 is too large, it counts three people as entering the line. This count is incorrect, however, as person 108 is in fact walking away from the entrance of the line.

Figure 3:
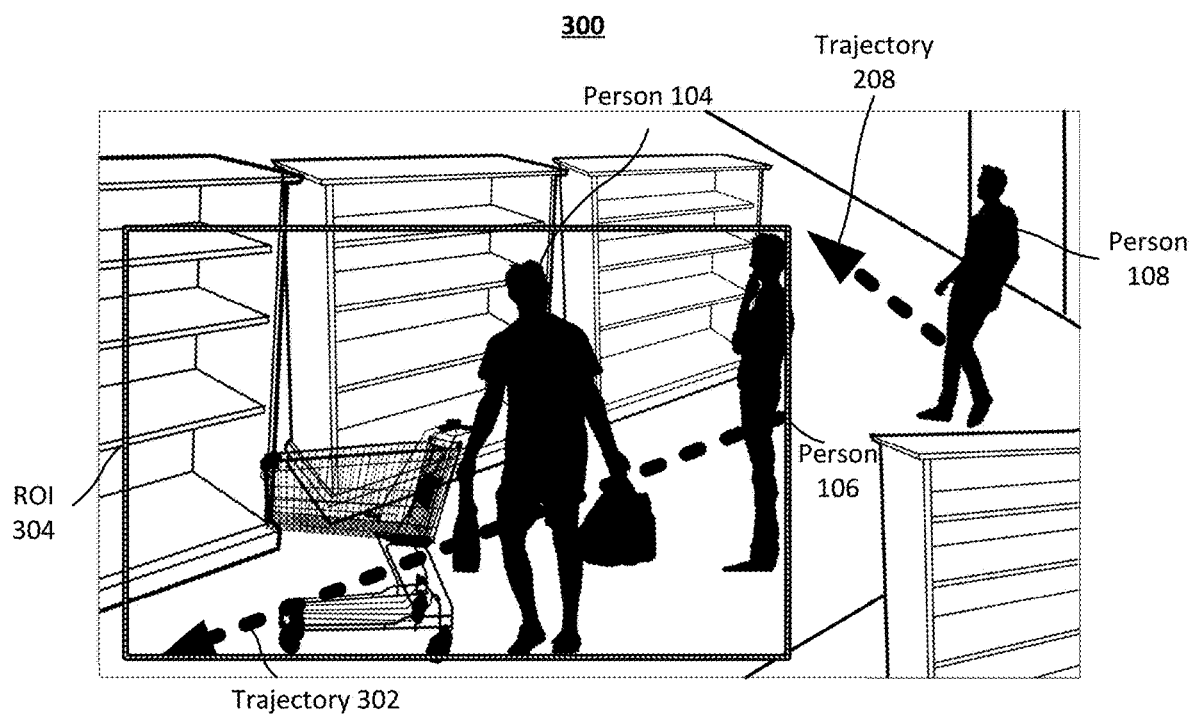
FIG. 3 is a diagram of a view of the camera in FIG. 1 with an updated ROI, in accordance with exemplary aspects of the present disclosure.

FIG. 3 is a diagram of view 300 of camera 102 in FIG. 1 with an updated ROI 304, in accordance with exemplary aspects of the present disclosure. To avoid the incorrect count of person 108, the present disclosure describes apparatuses and methods to update initial ROI 202 to be more appropriate for accomplishing its task, e.g., in this case, counting the number of people entering a checkout line. In FIG. 3, updated ROI 304 is determined based on an average trajectory 302 of person 104 and person 106. As will be described in FIG. 6, the trajectories of person 104 and person 106 are similar, whereas the trajectory of person 108 is not. Grouping common trajectories enables the apparatuses and methods of the present disclosure to better identify which subset of the video frame captured in view 300 is in fact important for serving the purpose of camera 102 (e.g., counting people in a checkout line).

Figure 4:
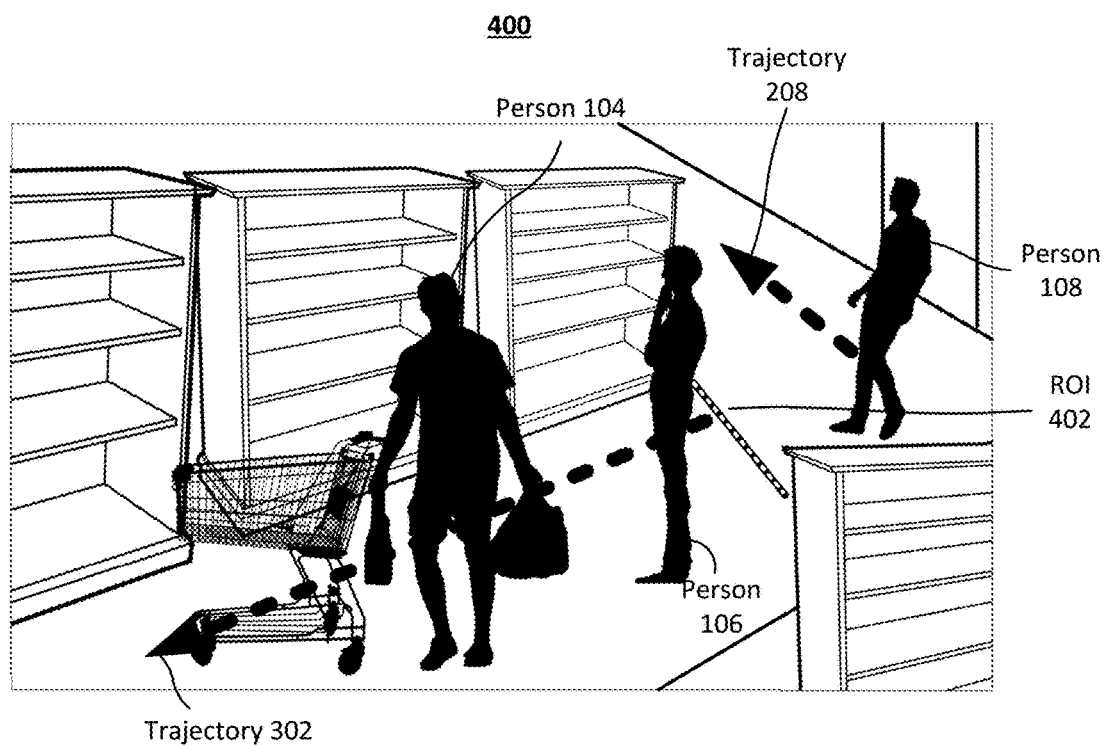
FIG. 4 is a diagram of a view of the camera in FIG. 1 with an updated ROI that is a line, in accordance with exemplary aspects of the present disclosure.

FIG. 4 is a diagram of view 400 of camera 102 in FIG. 1 with updated ROI 402 that is a line, in accordance with exemplary aspects of the present disclosure. In some aspects, the ROI of a camera bounds a subset of pixels inside a frame and limits computations regarding the task of camera 102 (e.g., counting people) to within the subset of pixels. The ROI may be any shape (e.g., a circle, oval, rectangle, pentagon, etc.). In some aspects, the ROI is a three-dimensional shape (e.g., a cube, a rectangular prism, sphere, etc.). For example, if the ROI is a rectangular prism that encompasses the checkout line, the apparatuses and methods may evaluate whether a person has entered/passed through the rectangular prism. In some aspects, the ROI is a line that an object may cross—signifying that the object has entered/exited an area of interest. For example, ROI 402 is a line at the entrance of the checkout line. When person 104 or person 106 pass through ROI 402, the person count is incremented. In contrast, the person count is not incremented for person 108 because he/she does not cross ROI 402.

Figure 5:
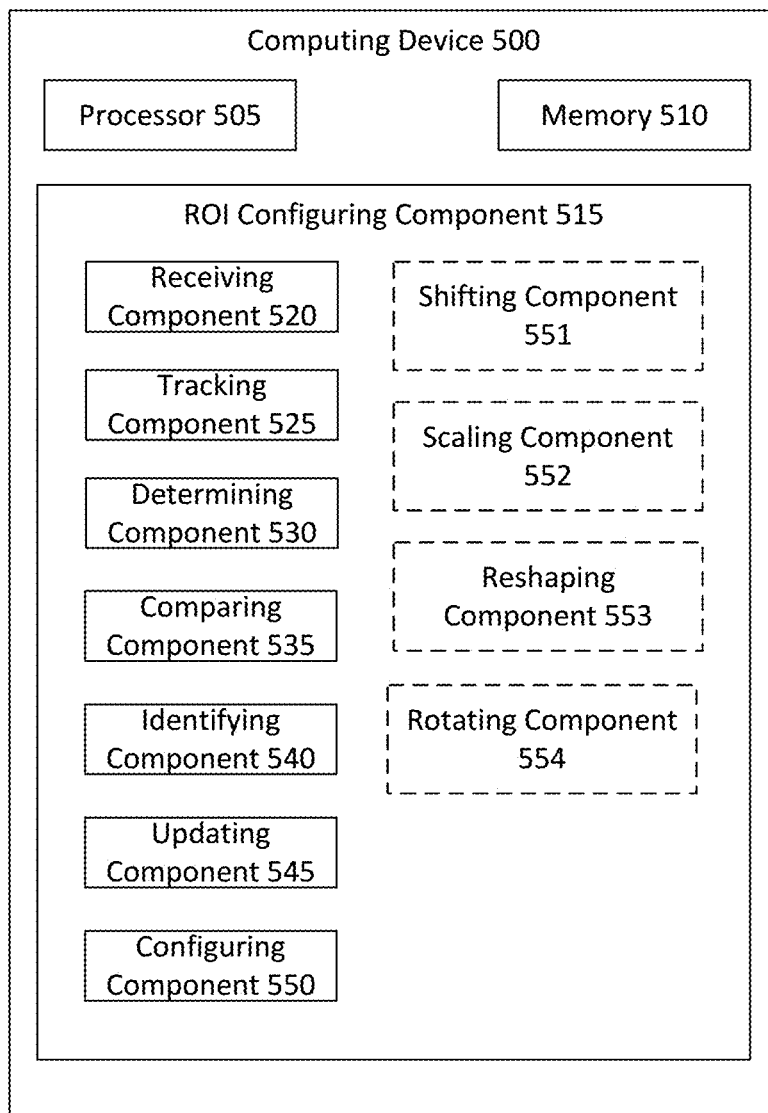
FIG. 5 is a block diagram of a computing device executing an ROI configuring component, in accordance with exemplary aspects of the present disclosure.
Figure 6:
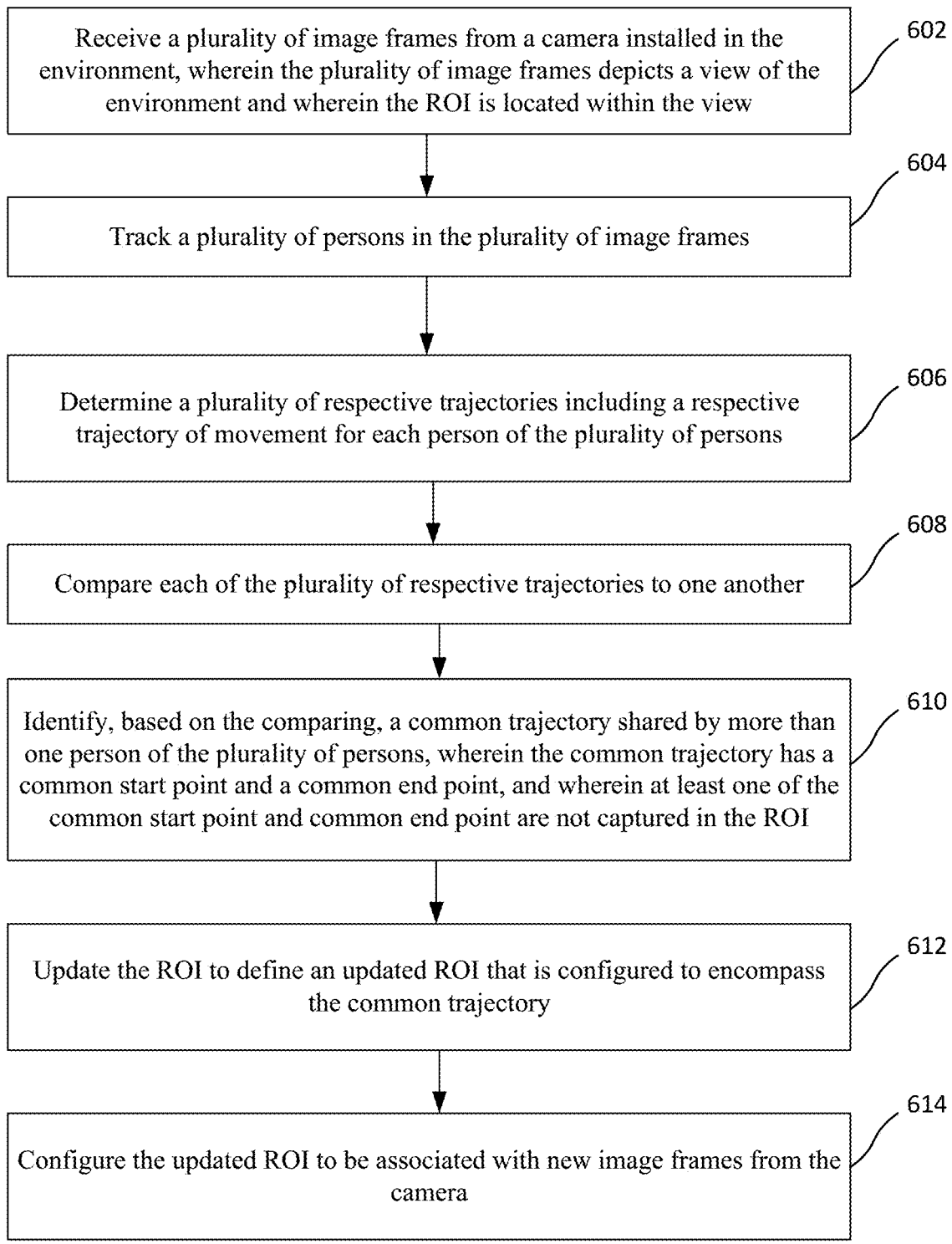
FIG. 6 is a flowchart illustrating a method of auto-configuring a region of interest (ROI) associated with a camera, in accordance with exemplary aspects of the present disclosure.

FIG. 5 is a block diagram of computing device 500 configured to execute an ROI configuring component, in accordance with exemplary aspects of the present disclosure. FIG. 6 is a flowchart illustrating method 600 of auto-configuring a region of interest (ROI) associated with a camera, in accordance with exemplary aspects of the present disclosure. Referring to FIG. 5 and FIG. 6, in operation, computing device 500 may perform method 600 of auto-configuring a region of interest (ROI) associated with a camera via execution of ROI configuring component 515 by processor 505 and/or memory 510.

At block 602, the method 600 includes receiving a plurality of image frames from a camera installed in the environment, wherein the plurality of image frames depicts a view of the environment and wherein the ROI is located within the view. For example, in an aspect, computer device 500, processor 505, memory 510, ROI configuring component 515, and/or receiving component 520 may be configured to or may comprise means for receiving a plurality of image frames from camera 102 installed in environment 100, wherein the plurality of image frames depicts view 200 of environment 100 and wherein ROI 202 is located within view 200. For example, receiving component 520 may receive via a wireless or wired connection a video stream from camera 102 and identify each frame in the video stream based on a name and timestamp, and an ROI 200 may have a known position and/or shape (e.g., based on a setting) within each frame.

At block 604, the method 600 includes tracking a plurality of persons in the plurality of image frames. For example, in an aspect, computer device 500, processor 505, memory 510, ROI configuring component 515, and/or tracking component 525 may be configured to or may comprise means for tracking persons 104, 106, and 108 in the plurality of image frames. Tracking component 525 may utilize computer vision techniques such as person recognition to identify persons 104, 106, and 108 in the frame. In some aspects, tracking component 525 may label each frame with a person identified within ROI 202. For example, the plurality of image frames may comprise frames f1 to fN, where N is a positive integer. Tracking component 525 may label f1 with an identifier of person 104 (e.g., insert in the metadata of the frame, the term "person 104," to signify that person 104 is present in the frame). In an example $100^{th}$ frame, f100, person 106 may enter ROI 202 and accordingly tracking component 525 may include the identifiers of both person 104 and 106 in the metadata of frame f100. In frame fN that depicts view 200, tracking component 525 may include identifiers of persons 104, 106, and 108 in the metadata of fN.

At block 606, the method 600 includes determining a plurality of respective trajectories including a respective trajectory of movement for each person of the plurality of persons. For example, in an aspect, computer device 500, processor 505, memory 510, ROI configuring component 515, and/or determining component 530 may be configured to or may comprise means for determining trajectories 204, 206, and 208 for persons 104, 106, and 108, respectively.

Each trajectory has a start point (e.g., as indicated by the beginning of the arrow) and an end point (e.g., the current position of the person or the anticipated position of the person). Determining component 535 may set the start point to a position where a person began walking and may set the end point to a position where he/she left the frame. In some aspects, determining component 530 may approximate the trajectory based on a plurality points that the person 104 walked along in between the start point and end point. Using linear regression, the line of best fit (which represents the trajectory of a person) may be determined. For example, based on each location of person 104 in the plurality of image frames, determining component 530 approximates a line/vector indicative of trajectory 204. In some aspects, the trajectory may be more complex than a straight line, in which case polynomial regression may be utilized to determine the curve of best fit.

Modeling the path a person moves along later allows ROI configuring component 515 to identify similar trajectories (whether straight or curved) and set the ROI to focus on capturing those identified trajectories. Using the types of regression listed above also allows determining component 535 to anticipate where a person is going to be at a future time. For example, in view 200, persons 104, 106, and 108 have not completely walked along their respective trajectories. However, based on their previous points of walking, determining component 535 may determine an anticipated end point and extend the trajectory.

In some aspects, trajectories 204, 206, and 208 may be lines a two-dimensional graph. The origin point of the graph may be the bottom left corner of view 200. Determining component 530 may treat each person as a point and monitor how the point travels across the plurality of frames that the point appears in. For example, a point on person 104 may be on the foot or head of person 104. Each trajectory can be associated with a pixel in a first frame that the trajectory starts from and a pixel in a subsequent frame that the trajectory ends at. Based on the locations of the pixels (as dictated by the movement of the point representing person 104), determining component 530 may identify a respective slope of the trajectory. For example, the slope of trajectory 204 may be 2, the slope of trajectory 206 may be 2.5, and the slope of trajectory 208 may be −0.75.

In some aspects, when the ROI is three-dimensional, determining component 530 may create a three-dimensional x-y-z representation of environment 100 relative to the walls and floor captured in view 200. For example, the wall near person 108 includes door 112. The height-wise line of the door may be characterized as parallel to the z-axis. The width-wise line of the door may be characterized as parallel to the x-axis. The y-axis may be determined as the axis perpendicular to both the x-axis and the z-axis. Trajectory 204 and 206 can therefore be represented as vectors. The vector of trajectory 208, for example, may be parallel to the x-axis, while trajectories 204 and 206 may have a larger components along the y-axis.

At block 608, the method 600 includes comparing each of the plurality of respective trajectories to one another. For example, in an aspect, computer device 500, processor 505, memory 510, ROI configuring component 515, and/or comparing component 535 may be configured to or may comprise means for comparing trajectories 204, 206, and 208 to one another.

Continuing the example given previously, comparing component 535 may select a subset of the determined respective trajectories that have neighboring start points within a first threshold distance, neighboring end points within a second threshold distance, and neighboring slopes within a threshold difference. Comparing component 535 may then calculate an average trajectory of the subset, wherein the average trajectory is the common trajectory, wherein the common start point is an average of the neighboring start points, and the common end point is an average of the neighboring end points.

For example, comparing component 535 may group all trajectories with slopes that are within the threshold slope difference. Suppose that the slope of trajectory 204 is 2, the slope of trajectory 206 is 2.5, and the slope of trajectory 208 is −0.75. The threshold slope difference may be 1. Accordingly, trajectories 204 and 206 may be in one group and trajectory 208 may be in a different group. Comparing component 535 may then select the group with the most trajectories and determine a subset of common trajectories that are in the same general vicinity. For example, although the slopes are similar of trajectories 204 and 206, their locations may be far apart, implying that persons did not walk around the same area in view 200. Accordingly, comparing component 535 may then determine whether the start points and end points of trajectories 204 and 206 are each within a threshold distance from one another. For example, the pixel where the start point of trajectory 204 is located may have the location (x1, y1) in the two-dimensional graph discussed above and the pixel where the start point of trajectory 206 is located may have the location (x2, y2). Comparing component 535 may calculate, via the two-dimensional distance formula, a distance D1 between the points and determine whether D1 is less than a threshold distance Dt. Likewise, comparing component 535 may determine whether the end points of trajectories 204 and 206 are within a threshold distance (may be same as Dt). In response to determining that both the start points and the end points are within the threshold distances, comparing component 535 may enter both trajectories in the subset of common trajectories. All other trajectories that are not in the subset may be identified as a plurality of uncommon trajectories by comparing component 535. Comparing component 535 may further identify these uncommon trajectories as ones to not include in the updated ROI.

At block 610, the method 600 includes identifying, based on the comparing, a common trajectory shared by more than one person of the plurality of persons, wherein the common trajectory has a common start point and a common end point, and wherein at least one of the common start point and common end point are not captured in the ROI. For example, in an aspect, computer device 500, processor 505, memory 510, ROI configuring component 515, and/or identifying component 540 may be configured to or may comprise means for identifying, based on the comparing, trajectory 302 shared by persons 104 and 108, wherein the common trajectory has a common start point and a common end point, and wherein at least one of the common start point and common end point are not captured in ROI 202.

In some aspects, it is possible for the plurality of persons to walk along the same trajectory. For example, the checkout area may be bounded in environment 100 by railings that guide customers along a single-file line. Because of this, every person may have the same start point and end point. This is referred to as a common start point and common endpoint. Because everyone walks along the same path, they all share a common trajectory.

In some aspects, however, the trajectory of each person may be slightly different (as shown in FIG. 2). Because of the differences, identifying component 540 may determine an average trajectory of all the trajectories in the subset of common trajectories. In order to determine the average trajectory, identifying component 540 may determine an average start point and an average end point (which become the common start point and common end point). In order to determine the average start point and end point, identifying component 540 may determine the midpoint between the start points of trajectories 204 and 206 along with the midpoint between the end points of trajectories 204 and 206. Identifying component 540 may then extend a line from the determined midpoints to generate trajectory 302. In some aspects, identifying component 540 may determine a plurality of midpoints between all of the points along trajectories 204 and 206 (not just the start and end), to determine the average trajectory (i.e., trajectory 302).

At block 612, the method 600 includes updating the ROI to define an updated ROI that is configured to encompass the common trajectory. For example, in an aspect, computer device 500, processor 505, memory 510, ROI configuring component 515, and/or updating component 545 may be configured to or may comprise means for updating ROI 202 to define updated ROI 304 that is configured to encompass trajectory 302.

In FIG. 2, the initial ROI 202 was quite large and thus incorporated all movements in view 200. The true focus of camera 102, however, should be the checkout line because there are several persons walking along the same path. In some aspects, an indication that trajectory 302 should be the focus (rather than trajectory 208) is that along trajectory 302, multiple persons in close proximity and the same speed may be moving.

Updating component 545 identifies the length of trajectory 302, and may generate ROI 304 which encompasses trajectory 302. For example, the start point and end point of trajectory 302 may be on the boundary line of ROI 304. In some aspects, the height of ROI 304 may be set based on the highest point on the body of a person walking in ROI 304. For example, the height of ROI 304 may be as high as the tip of the head of person 106. This height enables persons to be identified within ROI 304 because presumably their head and body will be captured in ROI 304. It should be noted that when updating the ROI, updating component 545 determines an updated ROI that does not encompass the plurality of uncommon trajectories. The specific way to update the ROI to encompass the common trajectory and the plurality of uncommon trajectories is discussed in FIG. 7.

At block 614, the method 600 includes configuring the updated ROI to be associated with new image frames from the camera. For example, in an aspect, computer device 500, processor 505, memory 510, ROI configuring component 515, and/or configuring component 550 may be configured to or may comprise means for configuring updated ROI 304 to be associated with new image frames from camera 102.

For example, configuring component 550 may associate subsequent frames from camera 102 with updated ROI 304. This means that if a new frame is received from camera 102, ROI configuring component 515 may set the ROI as updated ROI 304 and when counting persons entering the checkout line, only the persons entering/exiting ROI 304 will be counted. This results in a more accurate count because updated ROI 304 will not count persons, such as person 108, who are walking along a much different trajectory than trajectory 302.

Figure 7:
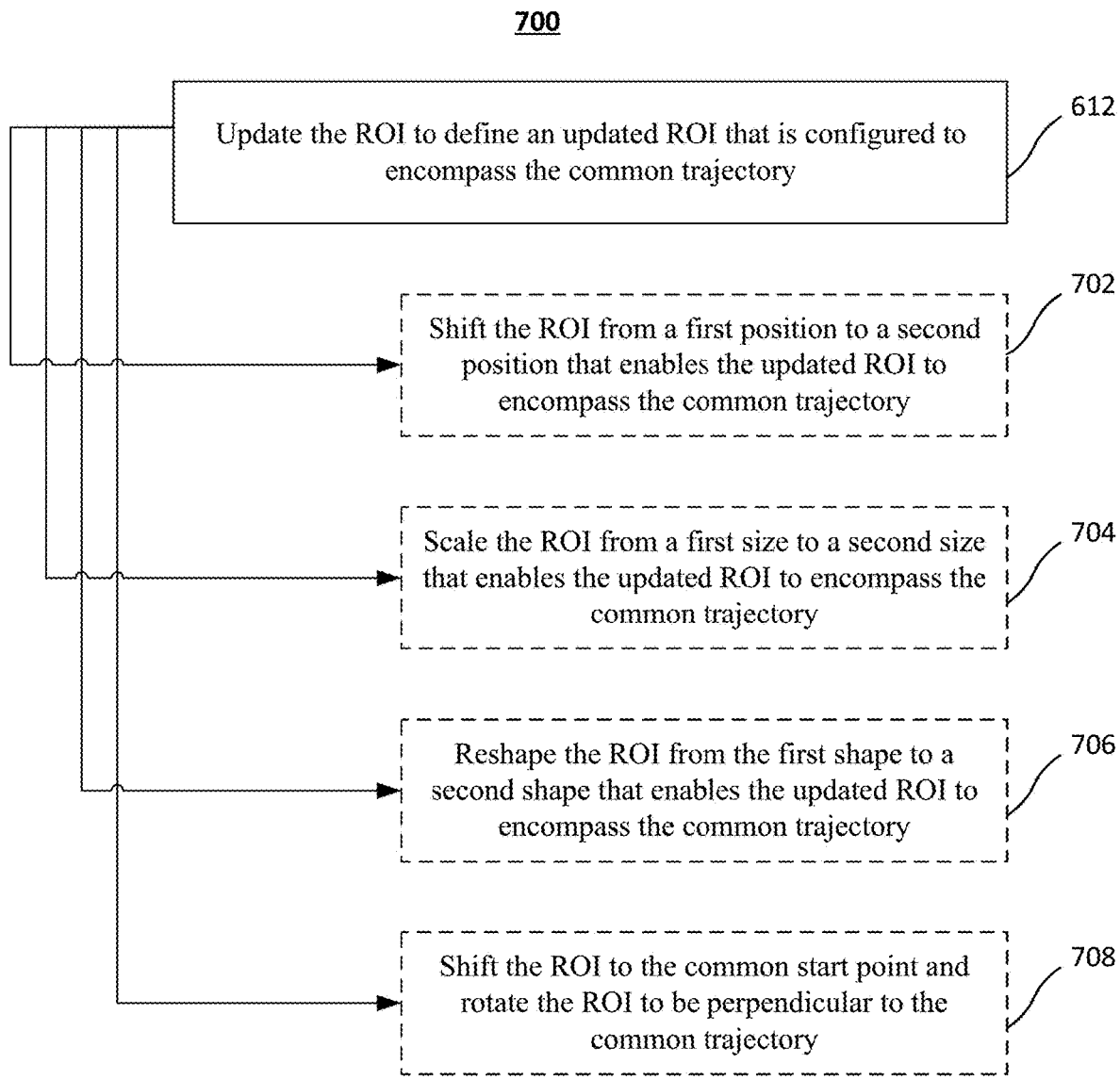
FIG. 7 is a flowchart illustrating a method of updating the ROI, in accordance with exemplary aspects of the present disclosure.

FIG. 7 is a flowchart illustrating method 700 of updating the ROI, in accordance with exemplary aspects of the present disclosure. FIG. 7 has four optional steps that are executed by in block 612. Although it is shown that only one of the four blocks are selected, depending on the height of the persons walking in a particular area, the length/position of the common trajectory, and the positions/lengths of the uncommon trajectories, any combination of the blocks may be performed. For example, block 702 may be executed, followed by any combination of 704, 706, and 708.

At block 702, the method 700 includes shifting the ROI from a first position to a second position that enables the updated ROI to encompass the common trajectory. For example, in an aspect, computer device 500, processor 505, memory 510, ROI configuring component 515, and/or shifting component 551 may be configured to or may comprise means for shifting ROI 202 from a first position to a second position that enables updated ROI 304 to encompass the common trajectory.

In this case, the dimensions (i.e., height and width) of initial ROI 202 may remain the same. ROI 202 may instead only be translated such that its center point changes from the first position to the second position.

At block 704, the method 700 includes scaling the ROI from a first size to a second size that enables the updated ROI to encompass the common trajectory. For example, in an aspect, computer device 500, processor 505, memory 510, ROI configuring component 515, and/or scaling component 552 may be configured to or may comprise means for scaling ROI 202 from a first size to a second size that enables updated ROI 304 to encompass the common trajectory.

In this case, the position of the center point of initial ROI 202 remains the same. However, the height and width of initial ROI 202 are changed to encompass trajectory 302.

At block 706, the method 700 includes reshaping the ROI from the first shape to a second shape that enables the updated ROI to encompass the common trajectory. For example, in an aspect, computer device 500, processor 505, memory 510, ROI configuring component 515, and/or reshaping component 553 may be configured to or may comprise means for reshaping ROI 202 from the first shape to a second shape that enables updated ROI 304 to encompass the common trajectory.

In this case, the shape of initial ROI 202 may be changed from a rectangle to a shape that can incorporate trajectory 302 (e.g., a square, oval, etc.).

At block 708, the method 700 includes shifting the ROI to the common start point and rotating the ROI to be perpendicular to the common trajectory. For example, in an aspect, computer device 500, processor 505, memory 510, ROI configuring component 515, and/or rotating component 554 may be configured to or may comprise means for shifting ROI 202 to the common start point and rotating ROI 202 to be perpendicular to the common trajectory.

In this case, the initial ROI may be a line that crosses the horizontal axis of view 200 along its midpoint. The updated ROI may be shifted and rotated (in any order) such that updated ROI 402 is perpendicular to the common trajectory (e.g., trajectory 302) and intersects with the common start point of trajectory 302. In some aspects, the length of the line may also be adjusted based on the length of the farthest start points in the subset of common trajectories. For example, if the farthest start points are (x1, y1) and (x2, y2), the length of ROI 402 is set to the distance between (x1, y1) and (x2, y2).

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for auto-configuring a region of interest (ROI) associated with a camera, comprising:
    receiving a plurality of image frames from a camera installed in an environment, wherein the plurality of image frames depicts a view of the environment and wherein the ROI is located within the view;
    tracking a plurality of persons in the plurality of image frames;
    determining a plurality of respective trajectories including a respective trajectory of movement for each person of the plurality of persons;
    comparing each of the plurality of respective trajectories to one another;
    identifying, based on the comparing, a common trajectory shared by more than one person of the plurality of persons, wherein the common trajectory has a common start point and a common end point, and wherein at least one of the common start point and common end point are not captured in the ROI;
    updating the ROI to define an updated ROI that is configured to encompass the common trajectory; and
    configuring the updated ROI to be associated with new image frames from the camera.

2. The method of claim 1, further comprising:
    identifying, based on the comparing, a plurality of uncommon trajectories; and
    wherein updating the ROI includes configuring the updated ROI to not encompass the plurality of uncommon trajectories.

3. The method of claim 1, wherein updating the ROI comprises shifting the ROI from a first position to a second position that enables the updated ROI to encompass the common trajectory.

4. The method of claim 1, wherein updating the ROI comprises scaling the ROI from a first size to a second size that enables the updated ROI to encompass the common trajectory.

5. The method of claim 1, wherein the ROI is of a first shape, and wherein updating the ROI comprises reshaping the ROI from the first shape to a second shape that enables the updated ROI to encompass the common trajectory.

6. The method of claim 1, wherein the ROI is a line, and wherein updating the ROI comprises shifting the ROI to the common start point and rotating the ROI to be perpendicular to the common trajectory.

7. The method of claim 1, wherein identifying the common trajectory comprises:
    selecting a subset of the determined respective trajectories that have neighboring start points within a first threshold distance, neighboring end points within a second threshold distance, and neighboring slopes including the neighboring start points and the neighboring end points; and
    calculating an average trajectory of the subset, wherein the average trajectory is the common trajectory.

8. The method of claim 7, wherein the average trajectory comprises the common start point and the common end point, and wherein the common start point is an average of the neighboring start points and the common end point is an average of the neighboring end points.

9. An apparatus for auto-configuring a region of interest (ROI) associated with a camera, comprising:
    a memory; and
    a processor in communication with the memory and configured to:
        receive a plurality of image frames from a camera installed in an environment, wherein the plurality of image frames depicts a view of the environment and wherein the ROI is located within the view;
        track a plurality of persons in the plurality of image frames;
        determine a plurality of respective trajectories including a respective trajectory of movement for each person of the plurality of persons;

compare each of the plurality of respective trajectories to one another;

identify, based on the comparing, a common trajectory shared by more than one person of the plurality of persons, wherein the common trajectory has a common start point and a common end point, and wherein at least one of the common start point and common end point are not captured in the ROI;

update the ROI to define an updated ROI that is configured to encompass the common trajectory; and configure the updated ROI to be associated with new image frames from the camera.

10. The apparatus of claim 9, wherein the processor is further configured to:

identify, based on the comparing, a plurality of uncommon trajectories; and wherein to update the ROI includes configuring the updated ROI to not encompass the plurality of uncommon trajectories.

11. The apparatus of claim 9, wherein to update the ROI comprises shifting the ROI from a first position to a second position that enables the updated ROI to encompass the common trajectory.

12. The apparatus of claim 9, wherein to update the ROI comprises scaling the ROI from a first size to a second size that enables the updated ROI to encompass the common trajectory.

13. The apparatus of claim 9, wherein the ROI is of a first shape, and wherein to update the ROI comprises reshaping the ROI from the first shape to a second shape that enables the updated ROI to encompass the common trajectory.

14. The apparatus of claim 9, wherein the ROI is a line, and wherein to update the ROI comprises shifting the ROI to the common start point and rotating the ROI to be perpendicular to the common trajectory.

15. The apparatus of claim 9, wherein to identify the common trajectory comprises to:

select a subset of the determined respective trajectories that have neighboring start points within a first threshold distance, neighboring end points within a second threshold distance, and neighboring slopes including the neighboring start points and the neighboring end points; and calculate an average trajectory of the subset, wherein the average trajectory is the common trajectory.

16. The apparatus of claim 15, wherein the average trajectory comprises the common start point and the common end point, and wherein the common start point is an average of the neighboring start points and the common end point is an average of the neighboring end points.

17. A non-transitory computer-readable medium for auto-configuring a region of interest (ROI) associated with a camera, including instructions executable by a processor to:

receive a plurality of image frames from a camera installed in an environment, wherein the plurality of image frames depicts a view of the environment and wherein the ROI is located within the view;

track a plurality of persons in the plurality of image frames;

determine a plurality of respective trajectories including a respective trajectory of movement for each person of the plurality of persons;

compare each of the plurality of respective trajectories to one another;

identify, based on the comparing, a common trajectory shared by more than one person of the plurality of persons, wherein the common trajectory has a common start point and a common end point, and wherein at least one of the common start point and common end point are not captured in the ROI;

update the ROI to define an updated ROI that is configured to encompass the common trajectory; and configure the updated ROI to be associated with new image frames from the camera.

18. The non-transitory computer-readable medium of claim 17, wherein the instructions are further executable by the processor to:

identify, based on the comparing, a plurality of uncommon trajectories; and wherein to update the ROI includes configuring the updated ROI to not encompass the plurality of uncommon trajectories.

19. The non-transitory computer-readable medium of claim 17, wherein to update the ROI comprises shifting the ROI from a first position to a second position that enables the updated ROI to encompass the common trajectory.

20. The non-transitory computer-readable medium of claim 17, wherein to update the ROI comprises scaling the ROI from a first size to a second size that enables the updated ROI to encompass the common trajectory.

* * * * *